Jan. 22, 1952 — A. I. KEGAN — 2,583,297
APPARATUS FOR ERASING THERMOPLASTIC PHONOGRAPH RECORDS
Filed July 31, 1948 — 5 Sheets-Sheet 1

INVENTOR.
Albert I. Kegan
BY Kegan and Kegan
attys

Jan. 22, 1952          A. I. KEGAN          2,583,297

APPARATUS FOR ERASING THERMOPLASTIC PHONOGRAPH RECORDS

Filed July 31, 1948          5 Sheets-Sheet 2

INVENTOR.
Albert I. Kegan
BY
Kegan and Kegan
attys

Jan. 22, 1952           A. I. KEGAN           2,583,297

APPARATUS FOR ERASING THERMOPLASTIC PHONOGRAPH RECORDS

Filed July 31, 1948           5 Sheets-Sheet 4

INVENTOR.
Albert I. Kegan
BY Kegan and Kegan
Attys

UNITED STATES PATENT OFFICE 2,583,297

APPARATUS FOR ERASING THERMOPLASTIC PHONOGRAPH RECORDS

Albert I. Kegan, Chicago, Ill., assignor, by mesne assignments, to Thomas A. Edison, Incorporated, West Orange, N. J., a corporation of New Jersey Application July 31, 1948, Serial No. 41,868

8 Claims. (Cl. 18—5.3)

The present invention relates to resurfacing thermoplastic articles, and to novel apparatus for that purpose. The invention is especially adapted to reclaiming used phonographic disk records made of thermoplastic material, by erasing the sound tracks therefrom.

This I accomplish thermally, by heating at least the surface of the thermoplastic article to a temperature sufficient to substantially obliterate surface irregularities. Since thin thermoplastic articles, such as record disks made of plastic rigid sheets of polyvinyl chloride-acetate resins and extensively used in office dictating machines, become too flaccid to maintain their shape at such temperatures, and stick to almost anything when their limpness results in contact, I find it convenient to maintain their shape during the heat treatment by centrifuging them. Articles such as phonographic record disks normally warp so much on cooling as to be worthless and ugly. I have discovered that such warping may be prevented by centrifuging the disks during cooling and until they take a permanent set.

Phonographic apparatus utilizing thermoplastic records have come into wide-spread use in recent years, particularly in the fields of home recording and office machine dictation. One of the principal reasons for this popularity is that such records give recordings of high fidelity, and are nonfrangible, light in weight, paper thin, and convenient to file where the original record is worth preserving. Prior to the present invention, however, it has been impossible to re-use thermoplastic records.

In the field of machine dictation, this resulted in high operating costs, since the records are usually discarded after being transcribed. This has been a serious obstacle to the adoption of disk-type dictating machines, for the competitive cylinder type dictating machines employ wax record cylinders which can be shaved and re-used 75 times or more.

Prior to my invention, it has not been feasible to obliterate surface irregularities such as sound track from thin thermoplastic sheets and to give the same a smooth polished appearance. Repressing and plate polishing are impractical with such thin sheets, which often are only 0.01 inch thick. And it hithertofore has been considered impossible to achieve the effects of pressing and plate polishing and yet not bring the surface being reclaimed into contact with any tool or forming surface. Yet this is precisely what I do.

It is a broad object of my invention, therefore, to provide apparatus for removing small irregularities from a surface of a thermoplastic article.

A more specific object is to provide novel apparatus for erasing the sound track from a phonograph disk recording made on thermoplastic material, so that said disk may be re-used as a blank upon which a new sound track may be recorded.

Another important object is to provide convenient apparatus for effectuating the foregoing objects.

Yet another object is to provide apparatus for erasing phonographic disk records, which apparatus is suitable for office use by an unskilled operator.

Still another object is to provide automatic apparatus for the purposes stated.

Another object of my invention is to provide apparatus which is simultaneously capable of reprocessing a plurality of used records, and that in a short interval of time.

In order that my invention may be more fully disclosed, reference is had to the accompanying drawings which exemplify apparatus for carrying out my novel method and which embody the foregoing and such other principles, advantages or capabilities as may be pointed out as this description proceeds, or as are inherent in the present invention. For purposes of clarity in teaching my novel method, the following description of suitable apparatus is made explicit, and the accompanying drawings are detailed, but it is distinctly to be understood that my novel methods are independent of any particular form of apparatus. Furthermore, the drawings and following description are only illustrative of suitable apparatus, and various changes may be made in the construction thereof within the scope of the mechanical means disclosed.

In the drawings.

Like reference characters designates like parts in the drawings and in the description which follows.

As indicated above, the method may be realized by heating a used disk record until plastic flow occurs and sensibly obliterates the sound track. Thereafter, the hot record preferably is spun in a cooling atmosphere until it has set. In practice, advantages are obtained by spinning the record throughout both the heating and the cooling portions of the cycle. In addition, I prefer to grasp the record only upon the unrecorded portion adjacent its center hole, so that the surface being erased does not come in contact with any object throughout the reprocessing cycle.

Figure 1:
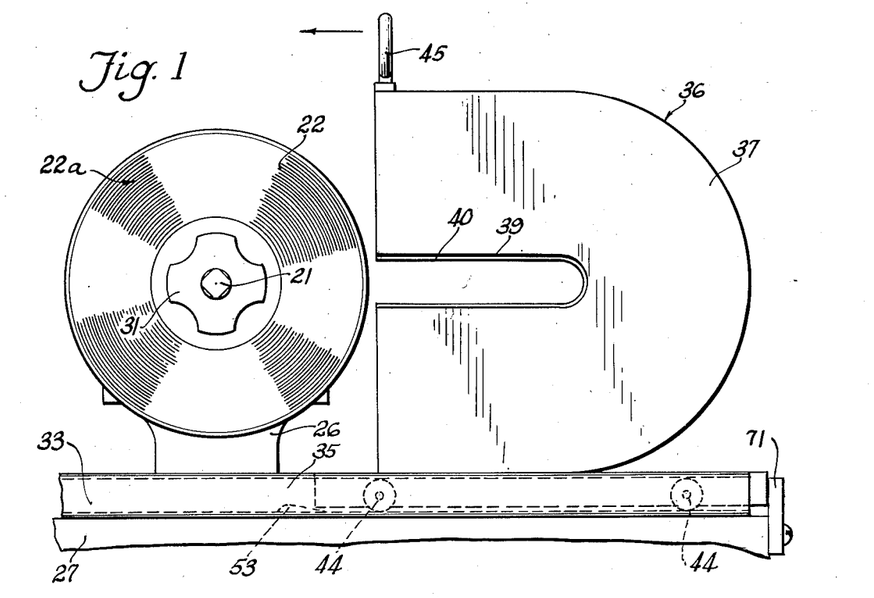
Figure 1 is a front elevation view of apparatus for performing my novel processes, especially upon phonographic disk records.
Figure 2:
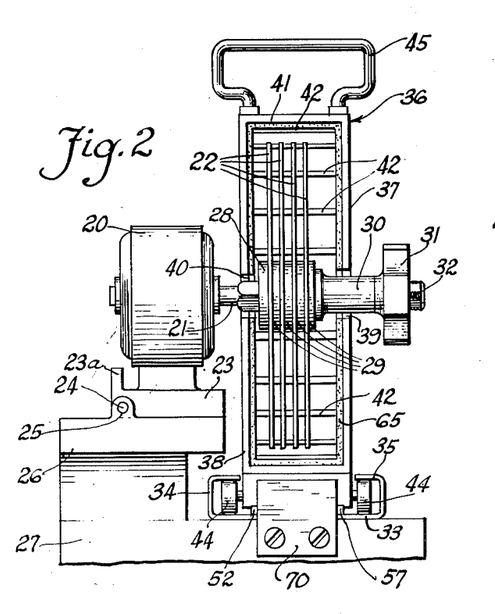
Figure 2 is a side elevational view of the apparatus of Figure 1.

Referring now more particularly to the drawings, Figures 1 and 2 taken together show apparatus which performs the foregoing operations. Said apparatus comprises three principal cooperating subassemblies, namely (a) mechanism for spinning the records, (b) apparatus for heating the records, and (c) means for controlling these subassemblies and their relation to each other.

Figure 3:
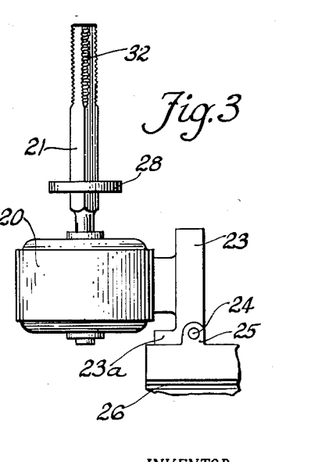
Figure 3 is a fragmentary side elevational view of the spindle, the motor and its base in record loading and unloading position.
Figure 4:
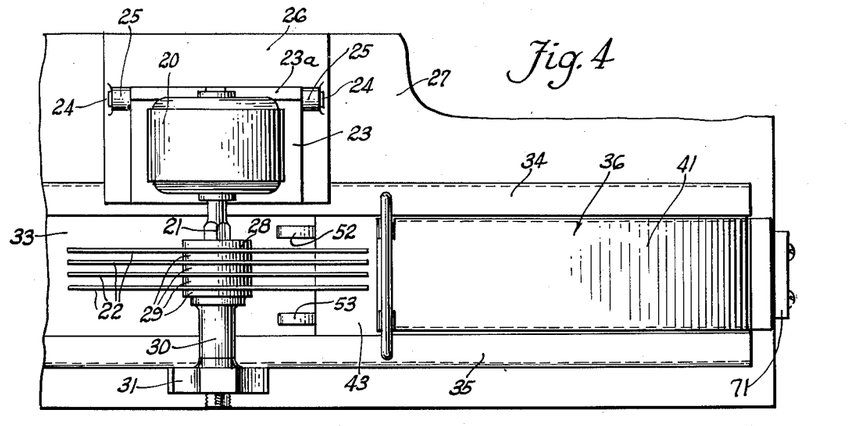
Figure 4 is a fragmentary plan elevational view of the apparatus of Figure 1.
Figures 8, 9, 10, 11, 12, 13:
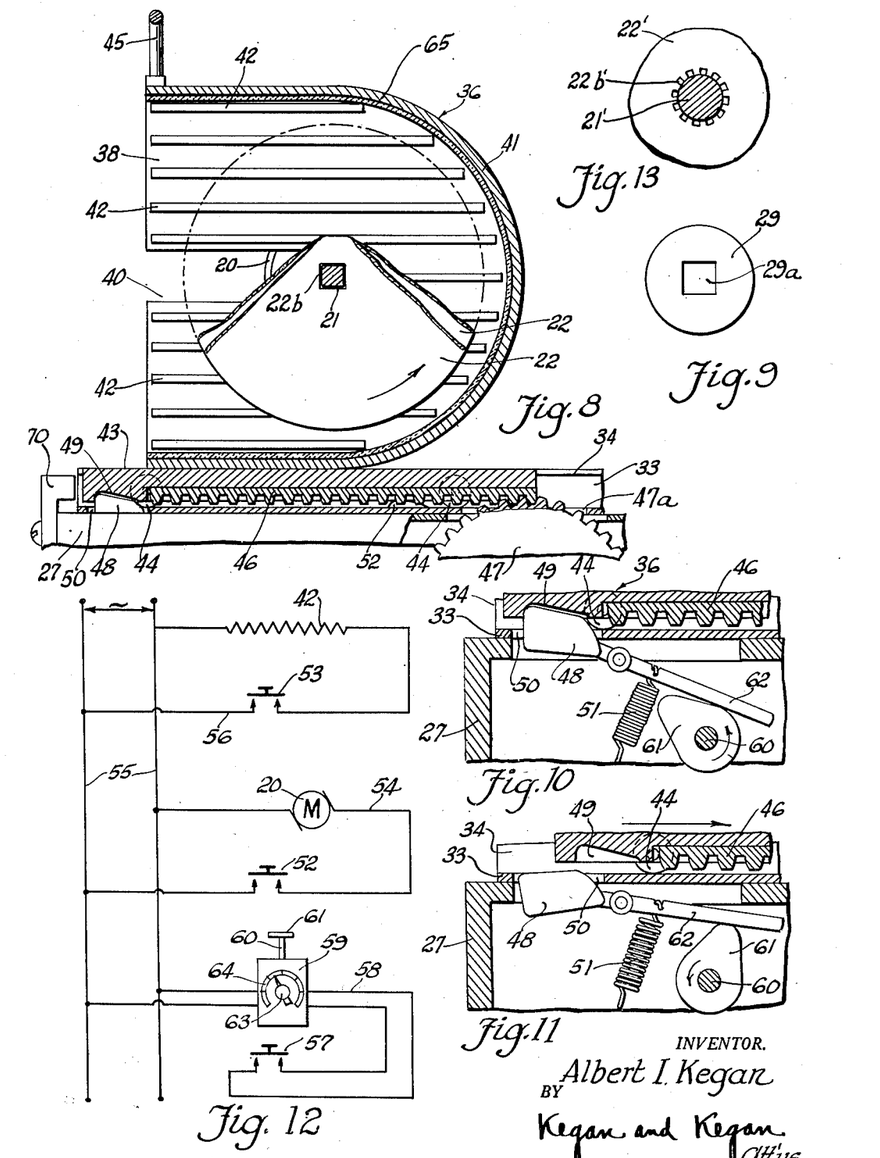
Figure 8 is a front elevational view of the apparatus in the operative position of Figure 7, taken in vertical central section and with portions of the records broken away to better disclose the construction of the heating chamber.
Figure 9 is a front elevational view of a washer which is used to space the records on the spindle.
Figure 10 is a detail fragmentary front elevational view in cross section, showing the catch mechanism for retaining the heating chamber in record heating position.
Figure 11 is a view similar to Figure 9, but showing the catch mechanism in disengaged position.
Figure 12 is a schematic electrical circuit diagram of the apparatus shown in the preceding figures.
Figure 13 is a fragmentary detail view in cross section, illustrating a modified form of the spindle of the motor.

The spinning mechanism includes the electrical motor 20 which turns spindle 21, shown carrying several records 22 having sound tracks 22a thereon which are to be erased. The base 23 of the motor 20 pivots on the pins 24, 24 journaled by a pair of trunnions 25, 25 projecting from the pedestal 26. The pedestal 26 in turn is mounted upon the frame 27 of the apparatus. By means of this arrangement and the stop 23a forming part of the base 23, the motor 20 may be tilted through 90° (Figure 3) to facilitate placing records 22 upon the spindle 21. As best shown in Figure 8, the cross section of the spindle 21 preferably conforms to the shape of the center opening 22b of the record 22.

In placing the records 22 upon the spindle 21, the first record is butted against the collar 28 secured permanently to the spindle 21, following which washers 29 (Figure 9) and records 22 are placed alternately upon the spindle 21 until the desired number of records 22 has been thus mounted. For purposes of securing a rigid assembly upon the spindle 21, the center opening 29a of the washers 29 is made to conform to the center opening 22b of the record 22 (see Figure 8). To clamp the records 22 firmly in place on the spindle 21, a spacer 30 of appropriate length is first placed on the spindle 21, following which the center tapped knob 31 is screwed onto the threaded portion 32 of the spindle 21, thereby causing the washers 29 to grasp the records 22 on the center unrecorded portions thereof. Thus the records 22 are spun by frictional engagement with the washers 29, thereby minimizing any tendency toward slippage between the spindle 21 and the records 22 and preventing consequent distortion of the center holes 22b of the records 22. Because the records are secured in place by means of frictional engagement with the washers 29, it is not essential that the cross section of the spindle 21 correspond exactly with that of the record 22. Thus for example, a spindle 21' (Figure 13) having a circular cross section may be used to advantage where the record 22' has a spline-shaped central opening 22b'.

As best shown in Figures 1 and 2, the heating chamber comprises a U-shaped connecting member 41 and a pair of side members 37 and 38, each of which is provided with a slot (39 and 40 respectively). The slots 39 and 40 are dimensioned to provide clearance for the spindle 21 and the spacer 30 when the chamber 36 is moved to enclose the records 22. As best shown in Figures 2 and 8, the interior wall surfaces of the heating chamber 36 are lined with insulation 65 to which electrical heating elements 42 are secured, the elements 42 preferably being arranged in a grid pattern which gives an even distribution of heat throughout the chamber 36.

Figure 5:
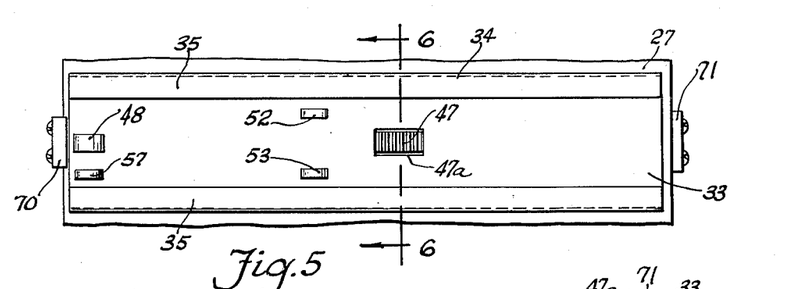
Figure 5 is a fragmentary detail plan elevational view of the base and track along which the heating chamber moves.

As is clearly shown in Figures 2 and 5, the mechanism for effecting an operative relationship between the heater 36 and the records 22 includes a channel 33 secured to the frame 27 and provided with a pair of retaining rails 34 and 35. Thus a track is provided along which the heater 36 is rollable.

The heating chamber 36 is secured along its bottom portion to the carriage 43, which is provided with a plurality of rollers 44 adapted to fit within and be retained by the rails 34 and 35. The heating chamber 36 is provided with a handle 45 for pulling said chamber along the channel 33.

Figure 6:
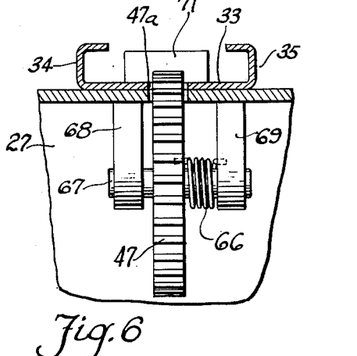
Figure 6 is a fragmentary front elevational view taken in sections on the line 6—6 of Figure 5, showing the spring loaded gear which exerts a restoring force upon the heating chamber as the latter is moved from the position of Figure 1.
Figure 7:
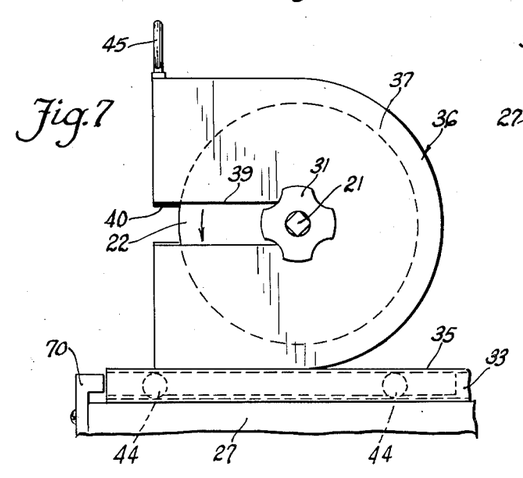
Figure 7 is a front elevational view of the apparatus of Figure 1 in record heating position.

As best shown in Figure 8, a rack 36 is secured to the under portion of the carriage 43 and meshes with a pinion gear 47 projecting upwardly through the slot 47a in the channel 33. The pinion gear 47 is spring-loaded (Figure 6) by means of a torsional spring 66 coiled upon the shaft 67, said shaft 67 being journaled by the studs 68 and 69. As the heating chamber 36 is moved to enclose the records 22 upon the spindle 21 and reaches the end of the channel 33, a catch 48 (Figure 10) engages the notch 49 in the carriage 43 and prevents the restoring force of the spring 66 from returning the heating chamber 36 until said catch is released (Figure 11). Said catch 48 extends through an opening 50 in the track 33 and is spring-loaded by the helical spring 51 (Figure 10). To prevent any possibility of the carriage 43 overrunning the end of the channel 33, I provide an end stop 70. Similarly, the stop 71 defines the rest position of the heating chamber 36 when the apparatus is not in use.

Advantageously, my novel apparatus may be adapted to either semi- or fully automatic operation, thereby securing uniform results even in the hands of unskilled operators. One novel electromechanical system whereby semi-automatic operation is achieved, is shown in simplified form in Figure 12, taken in conjunction with Figure 5. In this system, the carriage 43 engages a pair of spring-loaded push-pull switches 52 and 53 as it moves along the channel 33. The switch 52 is in circuit 54 which, when closed, connects the motor 20 to the electric power line 55. A second circuit 56 containing the switch 53 is in parallel with circuit 54. Upon closing the switch 53, therefore, the heating elements 42 of the heating chamber 36 are energized. Consequently, as the heating chamber 36 is moved along the channel 33 toward the spindle 21, the motor 20 starts to spin the records 22 and the heating elements 42 warm up. Upon reaching the end of the channel 33, the carriage 43 engages the catch 48, and simultaneously closes the spring-loaded push-pull switch 57, which forms a part of circuit 58, which is also in parallel with circuits 54 and 56. Closing said switch 57 energizes an electrical timer mechanism 59. A shaft 60 and a cam 61 (best shown in Figures 10 and 11) form a part of the timer mechanism 59 and contact the trip lever 62 of the catch 48. After a pre-determined length of time, which is regulated by adjustment of the pointer 63 along the time scale 64, the cam 61 rotates through 360° and in so doing disengages the catch 48 from the notch 49, thereby permitting the spring 66 to return the heater 36 to its inoperative position. After the cam 61 returns to the null position, the spring 51 returns the catch 48 to the "up" position.

The preferred manner in which the above described apparatus is used to carry out my novel processes, is as follows: The operator first tilts the motor 20 into the position shown in Figure 3, thereby presenting the spindle 21 in a position which facilitates loading the records 22 thereon. After placing the records 22 and the spacers 29 on the spindle 21 and securing them in place in the manner already described, the operator returns the motor to the position shown in Figure 2, grasps the handle 45 and pulls the heater 36 along the channel 33 until the catch 48 and notch 49 lock the heater 36 over the records. By wiring the motor 20 to turn in a counterclockwise direction (Figure 1) and threading the portion 32 and the knob 31 with a right hand thread, rotation of the records tends, if anything, to tighten the knob 31 upon the spacer 30. Thus the records 22 are held firmly in place while spinning.

The apparatus now spins and heats the records for the predetermined interval of time, which is sufficient to raise the surface temperature of the records high enough to obliterate the sound track. Advantageously, the centrifugal forces acting upon the surfaces of the spinning records 22 augment the surface tension forces and hasten flow of the surface and consequent erasure of the sound track. Even more important, the centrifugal force maintains the records in a planar configuration.

After the requisite length of time required for obliteration of the sound tracks has elapsed, the timer mechanism 59 causes the cam 61 to release the catch 48, thereby permitting the spring-loaded pinion gear 47 to rotate clockwise (Figure 8) and move the heating chamber 36 to the right until the carriage comes to rest against the stop 71. As the carriage 43 returns to the null position, the switches 52, 53, and 57 open the motor circuit 54, the heating element circuit 56 and the timer circuit 58, respectively, thereby turning off the spinning motor, the heating elements, and the timer. Because of the inertia of the turning armature of the motor 20, the spindle 21, and the elements secured thereto, the records 22 continue to spin for a considerable length of time after the motor circuit 54 is broken. Thus, the records 22 continue to spin as they are exposed to the open air, which speeds the cooling thereof. Meanwhile centrifugal force maintains the records 22 in planar configuration and keeps them from warping while they cool. When spinning ceases, the spindle 21 is turned up (Figure 3), and the records 22 are removed. They may now be used again as blanks, and be recorded upon.

Figures 14 through 23 illustrate a fully automatic embodiment of apparatus within the purview of the present invention. It is only necessary to load this apparatus with one or more records and press a button, in order to erase said records.

Figure 14:
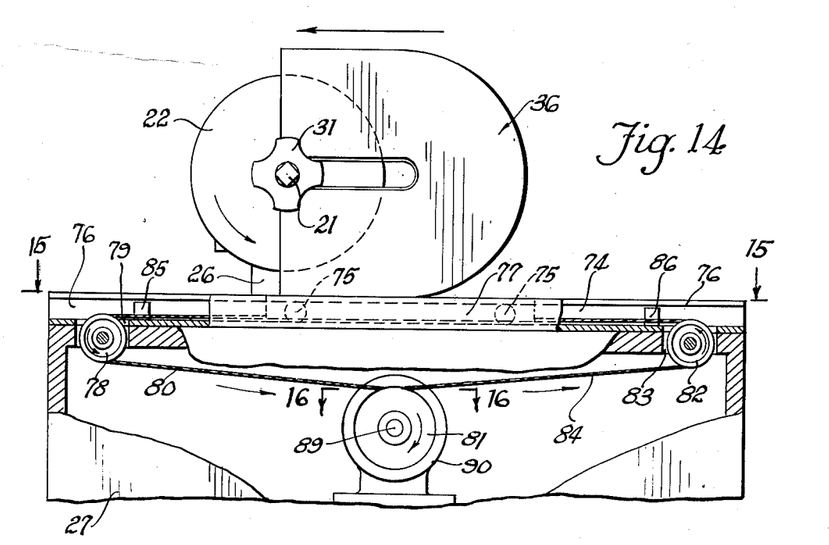
Figure 14 is a front elevational view of another embodiment of apparatus for performing my novel processes, with parts thereof broken away to show a portion of the apparatus comprising an automatic program control system.
Figure 15:
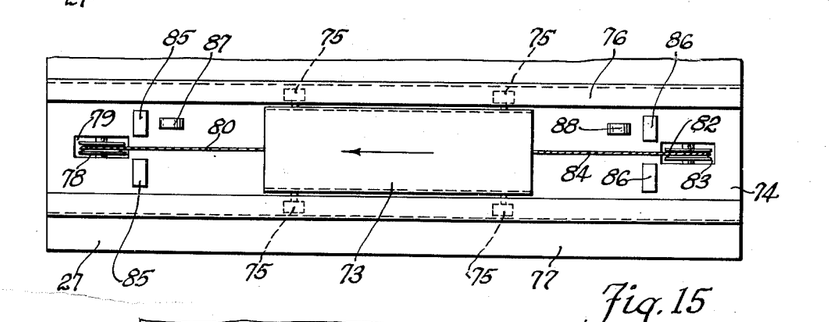
Figure 15 is a plan elevational view taken on the line 15—15 of Figure 14 to show details of the base and track along which the heating chamber moves.
Figure 16:
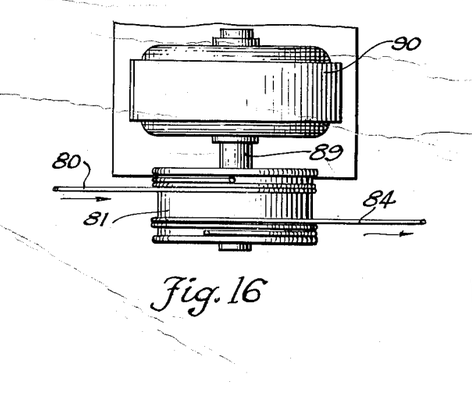
Figure 16 is a fragmentary detail plan elevational view taken on the line 16—16 of Figure 14 showing the electric drive for positioning the heating chamber along the track.

In Figure 14, the heating chamber 36 is shown in the course of enclosing the spinning records 22. As in the case of the embodiment shown in Figures 1–13, the heating chamber 36 is mounted upon a carriage 73 movable along a track or channel 74, the rollers 75 being guided by the guide rails 76 and 77. In addition, a pulley 78 is rotatably secured to the frame 27 by journaling means (not shown), and extends a short distance above the opening 79 in the channel 74. A cable 80 passes around the pulley 78, one end of the cable 80 being attached to the carriage 73, while the other end is coiled clockwise around the drum 81 (Figure 14). A corresponding pulley 82 extends above the opening 83 disposed at the other end of the channel 74. A second cable 84 passes over the pulley 82 and connects the carriage 73 and the drum 81, the cable 84 being wound counterclockwise around the latter.

A pair of stops 85, 85 (best shown in Figure 15) limits the travel of the carriage 73 along the channel 74. Similarly, the stops 86, 86 define the end position of the carriage 73 as it moves in the opposite direction along the channel 74 after the records 22 have been reprocessed. As the carriage 73 approaches its extreme position to the left (Figure 15), it trips and opens the switch 87 forming a part of the control circuit described below. A similar switch 88 is opened by the carriage 73 as it approaches the end of its travel to the right.

The drum 81 is turned by the servo-motor 90, through the shaft 89. As shown by directional arrows in Figure 14, clockwise rotation of the motor 90 causes the cable 80 to wind upon the drum 81 and the cable 84 to unwind, thereby moving the carriage 73 to the left. To move said carriage 73 to the right, the polarity of the field 90b (Figure 17) of the motor 90 is reversed with respect to that of the armature 90a. Thus the motor 90 serves to move the heating chamber 36 in both directions along the channel 74. To clarify the manner in which the motor 90 is connected to a source of electric current to provide for rotation in either direction, the motor circuit is shown in duplicate in Figure 17, the circuit designated 91a providing for clockwise rotation of the drum 81, and the circuit designated 91b providing for counterclockwise rotation of said drum 81. When bridging members 92 and 93 close circuit 91a, current may be considered as flowing from the contact 94 to the contact 95. On the other hand, when the bridging members 96 and 97 of the circuit 91b close said circuit, the current through the armature is reversed, since the current flows from contact 95 to contact 94.

The members 92, 93, 96 and 97 are actuated automatically, and in the proper sequence to correctly move and position the heating chamber 36. This may be accomplished, for example, by the timing subassembly shown in Figures 18 and 19. Said subassembly includes an electric timer 98, of the type which turns the timer shaft 103 through precisely one complete revolution each time the switch 72 is actuated. The cams 99, 100, 101, and 102, are each keyed to the timer shaft 103, and rotate with it. Said cams are shaped to impose the desired program control upon the electrical circuits, and act through suitable cam follower mechanism. Thus, as the cam 99 turns, the rise and fall of the roller 104 moves the follower 105 to close and open switch 106 in circuit 107, thereby controlling the record-spinning motor 20. Said follower 105 pivots about the line shaft 108, while the roller 104 is kept in contact with the cam surface by means of the spring 109.

Cam 102 operates similarly through roller 110 and follower 111 to close or open, respectively, switch 112 in circuit 113—spring 114 maintaining said roller 110 in contact with the cam surface of cam 102. Thus cam 102 energizes and de-energizes heater coils 42 according to a pre-arranged pattern. In like fashion, the rollers 115 and 116 transmit motion from the cams 101 and 102 to the followers 117 and 118 respectively. Said followers 117 and 118 each turn about the line shaft 108, and are acted upon by springs 119 and 120, respectively. Movement of the follower 117 controls the movement of the bridging members 92 and 93, and hence the leftward movement of the heater carriage 73; while follower 118 controls the position of the bridging members 97 and 98, and hence the movement to the right of said carriage 73.

Figures 17, 18, 19, 20, 21, 22, 23:
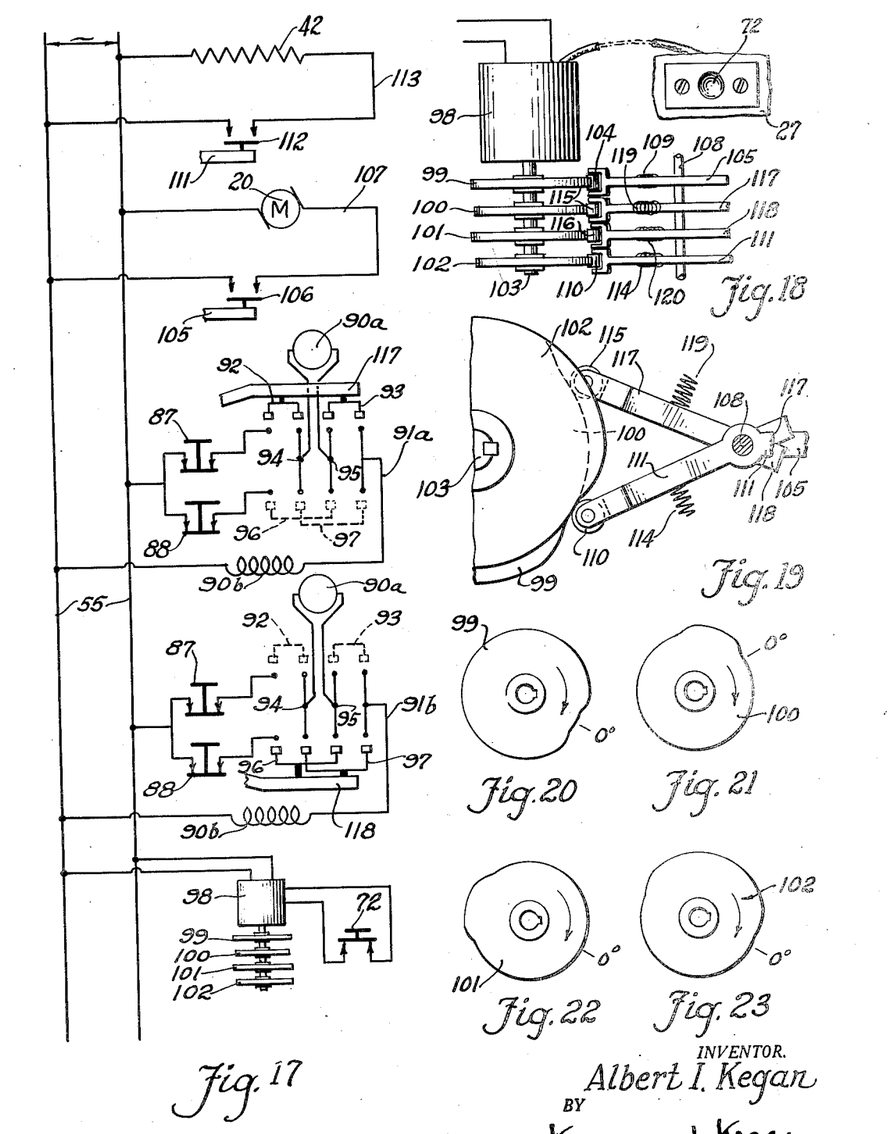
Figure 17 shows the electrical circuit forming a part of the automatic program control system, certain of the cooperating mechanical elements being shown schematically.
Figure 18 is a plan elevational view of the timer element and the mechanism actuated thereby.
Figure 19 is a fragmentary front elevational view of the apparatus of Figure 18.
Figures 20 through 23 inclusive, are front elevational views of the cams driven by the timer element.

In Figure 19, the rollers 104, 110, 115 and 116 are all shown in contact with a dwell portion of their respective cam surfaces. This is the condition which exists when the heating chamber 36 is in the position shown in Figure 1. This initial dwell, or null position is designated in Figures 20 through 23 by the zero degree (0°) markings adjacent the cams. Because of the different position of the follower 117, the zero mark of cam 100 of Figure 21 is displaced counter-clockwise of the zero marks of the cams 99, 101, and 102. As long as the rollers 104, 110, 115 and 116 contact dwell portions of the cams, the interconnected switches of circuits 107, 113, 91a and 91b, respectively, remain open, as shown in Figure 17. Conversely, as the rollers 104, 110, 115 and 116 contact rise portions of their respective cams, the corresponding switches are closed, and the corresponding components of the control system are energized.

As the timer 98 commences to turn, the rollers 104, 115, and 110 engage rise portions of the cams 99, 100, and 102 respectively, thereby causing the motor 20 to centrifuge the records 22, the heating elements 42 to heat the chamber 36, and the servo-motor 90 (Figures 14 and 16) to move the chamber 36 to surround the records 22.

To safeguard against jamming the heating chamber 36 against the stops 85, 85 while the servo-motor 90 is running, the switch 87 is incorporated into circuit 91a and is automatically opened by contact with the carriage 73 as the latter approaches its end position to the left. The heating chamber 36 then glides to a stop against the stops 85, 85. Shortly thereafter, the dwell portion of the cam 100 is reached by its roller 115, which causes the bridging members 92 and 93 automatically to be lifted away from their engaging contacts.

After the heating of the records 22 has continued through about 160° of cam travel, the dwell portion of the cam 102 is again reached. This opens switch 112 and disconnects the heating elements 42 from the line 55. At about the same time, the rise portion of the cam 101 is reached by the roller 116, which acts to close circuit 91b of Figure 17. Since this reverses the armature connections relative to the field connections, hence the motor 90 commences to turn counter-clockwise, and moves the heating chamber 36 to the right (Figure 14), away from the spinning records. Again, to safeguard against jamming the carriage 73 against the stops 86, 86 while the motor 90 continues to turn, I provide a switch 88 in the circuit 91b which is opened upon contact with the carriage, thereby insuring that the motor 90 is disconnected from the line 55 just before the carriage 73 reaches the stops 86, 86.

After the heating chamber 36 has moved away from the records 22, the motor 20 continues to spin the records 20 until the dwell period of the cam 99 is reached. Using the cam proportions of Figures 20 through 23 for example, the motor 20 remains energized for about 140° of cam travel after the heating chamber has returned to its null position. Thus the records are power centrifuged while they cool in the air, which prevents them from warping while being cooled. When cam 99 presents its dwell surface to roller 104, switch 106 is opened, thereby turning off the record-spinning motor 20. Timer 98 then completes its rotation of timer shaft 103 through 360°, and comes to rest. The apparatus has then completed its cycle of operation, and is in its initial "off" position, ready to repeat the cycle when button 72 is pressed again. The operator merely removes the resurfaced records, and reloads the apparatus with other records requiring erasure.

A record thus resurfaced has its sound track sensibly obliterated, so that even when the phonograph is set at maximum amplification, no message can be heard from the resurfaced record. At normal amplification, nothing is heard other than background scratch like that produced by a new blank record. The reconditioned record looks like a new blank record, although sometimes a faint trace of the original groove may be visually discerned even though it cannot be heard on the phonograph. This trace does not interfere with the fidelity of the sound recording subsequently placed upon the record. Advantageously, by means of my novel process a disk type thermoplastic blank may be used over and over again, being recorded upon, transcribed, erased, and again recorded upon, through many cycles of such use.

It is obvious that the methods taught herein may be used to resurface articles other than used phonograph records, and that the apparatus disclosed herein likewise may be adapted to resurface a variety of thermoplastic articles.

I therefore claim as my invention:

1. Apparatus for erasing an embossed sound track from a used thermoplastic record disk having a center opening therein, comprising: a shaft spaced to engage said opening to support said disk by its central unused portion in a plane at right angles to the shaft, a motor for rotating said shaft at a speed sufficient to maintain the disk flat while it is in a heated condition, a chamber normally spaced from said shaft, means for moving said chamber to substantially surround said disk when rotating on said shaft, catch means for retaining said chamber in position surrounding said disk, heater elements in said chamber, means for energizing said motor and said heater elements while said chamber surrounds said disk, timer means for releasing said catch means after a predetermined time interval, means for separating said chamber from said disk when said catch means is released, and means for maintaining rotation of said shaft and the disk thereon after said chamber is separated therefrom until said disk is cooled.

2. A machine for reconditioning a used phonograph record disk of thermoplastic material to obliterate embossed record grooves therefrom, comprising rotatable means for holding a record disk by its central unused portion for rotation about its geometric axis; means for heating said record disk to a temperature sufficient to obliterate said grooves therefrom; power-actuated means for rotating said holding means and the disk thereon to maintain the disk flat by centrifugal action while it is in a heated condition; means for concurrently shutting off the actuating power to said rotating means and said heating means; and inertia means associated with said rotating means for maintaining rotation of said holding means after the power to said rotating means is shut off for an interval sufficient to maintain said record disk flat by centrifugal force until the disk has cooled.

3. A machine for reconditioning a used phonograph record disk of thermoplastic material to obliterate embossed record grooves therefrom, comprising rotatable means for holding a record disk by its central unused portion for rotation about its geometric axis; a heater for said record disk; a carriage for said heater mounted for moving the heater into an effective position in juxtaposition with said record disk and into an ineffective position away therefrom; means for rotating said holding means at a speed sufficient to maintain the disk flat by centrifugal force while the disk is in a heated condition; motor-driven means for moving said carriage; and switch means in said motor circuit operated by said carriage as said heater nears said effective and ineffective positions respectively for opening the motor circuit.

4. A machine for reconditioning a used phonograph record disk of thermoplastic material, to obliterate embossed recordations therefrom, comprising a rotatably-mounted shaft having means thereon for supporting a record disk by its central unused portion in a vertical plane for rotation about its geometric axis, a heating means mounted for movement into an effective position wherein it is juxtaposed to said record disk and into an ineffective position away from said disk, a motor for driving said shaft and the disk thereon to maintain the disk flat by centrifugal action while it is in a heated condition, and pivoted mounting means for said shaft operable when said heating means is in ineffective position to move said shaft into a vertical position.

5. A machine for reconditioning used phonograph record disks of thermoplastic material, to obliterate embossed recordations therefrom, comprising a rotatably-mounted horizontal shaft having clamping means and intervening record separators for holding a plurality of record disks by their unused central portions in axial alignment with said shaft and at space intervals along said shaft for rotation about their geometric axes in vertical planes; a heating chamber for embracing said plurality of mounted disks; a motor for rotating said shaft at a speed to maintain said disks flat by centrifugal action while the disks are in a heated condition, and a pivoted mounting for said shaft operable to swing the shaft into a vertical position to allow the record disks and said separators to be stacked on said shaft and held gravitationally in place until they are secured to the shaft by said clamping means.

6. A machine for reconditioning a used thermoplastic disk to obliterate embossed record grooves therefrom, comprising rotatable means for holding a record disk by its central unused portion for rotation about its geometric axis; a heating chamber mounted for movement into effective position wherein the chamber surrounds the disk mounted on said holding means and for movement into an ineffective position away from said disk; drive means for rotating said disk-holding means and for moving said heating chamber between effective and ineffective positions; means for disabling said drive means as to said heating chamber when the heating chamber reaches effective position; and a timing mechanism effective upon expiration of a predetermined interval during which said heating chamber is at rest in effective position for abling said drive means to return said heating chamber to ineffective position.

7. A machine for reconditioning a used thermoplastic disk to obliterate embossed record grooves therefrom, comprising rotatable means for holding a record disk by its central unused portion for rotation about its geometric axis; a heating chamber mounted for movement into effective position wherein the chamber surrounds the disk mounted on said holding means and for movement into an ineffective position away from said disk; means for rotating said disk-holding means; means for moving said heating chamber from ineffective to effective positions and back again; means operable to start said rotating and moving means; and a unitary timing mechanism rendered operative by said starting means concurrently as said rotating and moving means are put in operation and including means controlling both said rotating and moving means to cause, in the sequence here named, said moving means to be disabled for a predetermined interval when said heating chamber reaches effective position, said moving means to be stopped when said heating chamber reaches ineffective position, and said rotating means to be stopped on expiration of a predetermined interval after said heating chamber reaches ineffective position.

8. The combination set forth in claim 7 including an on-off heater switch for the heating circuit of said heating chamber, means for closing said heater switch by said starting means as the latter is moved to starting position, and means controlled by said timing mechanism to open said heater switch at the start of return of said heating chamber to ineffective position.

ALBERT I. KEGAN.

REFERENCES CITED

The following references are of record in the file of this patent:

UNITED STATES PATENTS

| Number | Name | Date |
|---|---|---|
| 2,265,032 | Feyrer | Dec. 2, 1941 |
| 2,340,161 | Van Deventer | Jan. 25, 1944 |
| 2,539,717 | Balmer | Jan. 30, 1951 |